(12) United States Patent
Kodama et al.

(10) Patent No.: US 7,877,359 B2
(45) Date of Patent: *Jan. 25, 2011

(54) BACKUP EXECUTABILITY JUDGING SYSTEM

(75) Inventors: Shoji Kodama, Sagamihara (JP); Kiyotake Kumazawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 373 days.

This patent is subject to a terminal disclaimer.

(21) Appl. No.: 12/068,207

(22) Filed: Feb. 4, 2008

(65) Prior Publication Data

US 2009/0125577 A1    May 14, 2009

(30) Foreign Application Priority Data

Nov. 9, 2007    (JP) .............................. 2007-291697

(51) Int. Cl.
*G06F 17/30* (2006.01)
(52) U.S. Cl. .................. 707/640; 707/661; 707/662; 707/663; 707/665; 707/666
(58) Field of Classification Search ................. 707/640, 707/661, 662, 663, 665, 666, 644, 645, 647, 707/649, 672, 674, 678, 679, 681
See application file for complete search history.

(56) References Cited

U.S. PATENT DOCUMENTS

| | | | |
|---|---|---|---|
| 5,758,359 A * | 5/1998 | Saxon ................................ 1/1 |
| 6,651,077 B1 * | 11/2003 | East et al. ........................... 1/1 |
| 7,152,080 B2 * | 12/2006 | Mikami ............................... 1/1 |
| 7,197,520 B1 * | 3/2007 | Matthews et al. ................... 1/1 |
| 7,657,720 B2 * | 2/2010 | Otani .......................... 711/162 |
| 7,680,830 B1 * | 3/2010 | Ohr et al. .................. 707/999.2 |
| 2005/0076070 A1 * | 4/2005 | Mikami ....................... 707/204 |
| 2007/0055716 A1 * | 3/2007 | Mikami ....................... 707/204 |
| 2007/0220319 A1 * | 9/2007 | Desai et al. .................... 714/13 |
| 2008/0059733 A1 * | 3/2008 | Otani .......................... 711/162 |
| 2008/0320219 A1 * | 12/2008 | Okada et al. ................. 711/114 |

FOREIGN PATENT DOCUMENTS

JP    2004-206611    12/2002

* cited by examiner

*Primary Examiner*—Jean M Corrielus
(74) *Attorney, Agent, or Firm*—Volpe & Koenig, P.C.

(57) ABSTRACT

A problem of prior art is that normal backup data is lost as a result of taking a backup by overwriting the normal backup data with data that has been changed greatly from a virus infection or the like. This invention provides a computer system having a storage system. The storage system contains a first storage area and a second storage area for storing a copy of data that is stored in the first storage area at one point in time. Only when the differential amount indicating the difference between data stored in the first storage area and data stored in the second storage area is smaller than a predetermined threshold, the storage system deletes the data which is stored in the second storage area and newly stores a copy of the data stored in the first storage area in the second storage area.

16 Claims, 13 Drawing Sheets

BACKUP POLICY MANAGEMENT TABLE

0108

| POLICY ID | BACKUP SOURCE | BACKUP DESTINATION | SCHEDULE | RETENTION PERIOD |
|---|---|---|---|---|
| BK001 | ORIG001 | MEDIA_GROUP001 | EVERYDAY AT NOON | ONE WEEK |
| BK002 | ORIG002 | MEDIA_GROUP002 | ONCE A WEEK | ONE MONTH |
| ⋮ | ⋮ | ⋮ | ⋮ | ⋮ |
| BK003 | ORIG003 | MEDIA_GROUP003 | EVERY HOUR | TWO WEEKS |

EXECUTION CONDITION TABLE

0104

| POLICY ID | DIFFERENTIAL CONDITION | DELETION POLICY |
|---|---|---|
| BK001 | [DIFFERENTIAL AMOUNT] < 100 | ACCORDING TO THE RETENTION PERIOD |
| BK002 | [DIFFERENTIAL AMOUNT] < 20 | THE SMALLEST DIFFERENTIAL AMOUNT |
| ⋮ | ⋮ | ⋮ |
| BK003 | [DIFFERENTIAL AMOUNT] < 30 | ACCORDING TO THE RETENTION PERIOD |

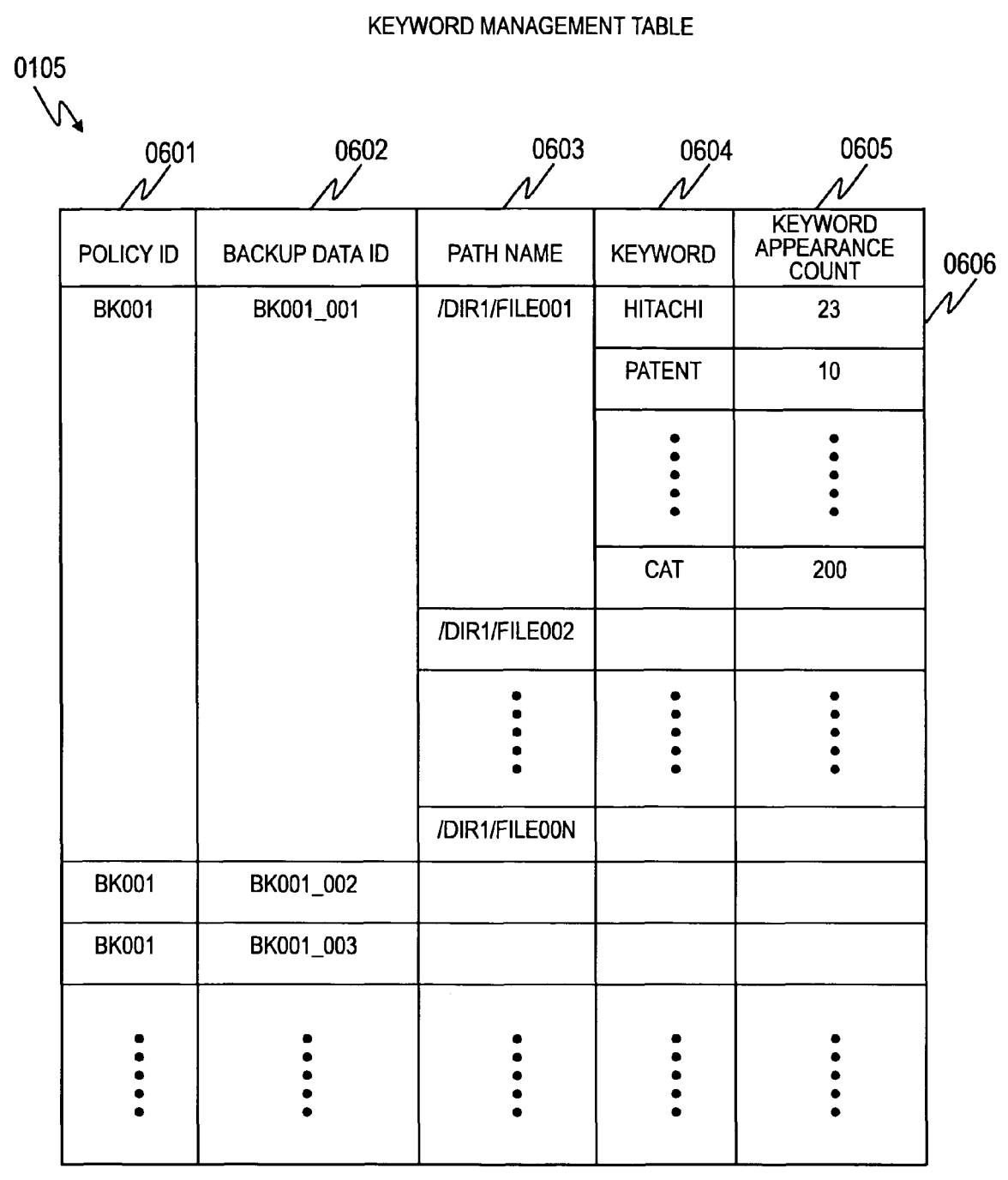

KEYWORD MANAGEMENT TABLE

| POLICY ID | BACKUP DATA ID | PATH NAME | KEYWORD | KEYWORD APPEARANCE COUNT |
|---|---|---|---|---|
| BK001 | BK001_001 | /DIR1/FILE001 | HITACHI | 23 |
| | | | PATENT | 10 |
| | | | ⋮ | ⋮ |
| | | | CAT | 200 |
| | | /DIR1/FILE002 | | |
| | | ⋮ | ⋮ | ⋮ |
| | | /DIR1/FILE00N | | |
| BK001 | BK001_002 | | | |
| BK001 | BK001_003 | | | |
| ⋮ | ⋮ | ⋮ | ⋮ | ⋮ |

*FIG. 6*

INDEX TABLE

0119

| STORAGE SOURCE | INDEX CREATION TIME | PATH NAME | KEYWORD | KEYWORD APPEARANCE COUNT |
|---|---|---|---|---|
| ORIG001 | 2007/8/22 0:00AM | /DIR1/FILE001 | HITACHI | 30 |
| | | | PATENT | 20 |
| | | | ⋮ | ⋮ |
| | | | CAT | 100 |
| | | /DIR1/FILE002 | | |
| | | ⋮ | ⋮ | ⋮ |
| | | /DIR1/FILE00N | | |
| ORIG002 | 2007/8/23 0:00AM | | | |
| ⋮ | ⋮ | ⋮ | ⋮ | ⋮ |
| ORIG003 | 2007/8/24 0:00AM | | | |

Column headers: 0701, 0702, 0703, 0704, 0705

*FIG. 7*

BACKUP EXECUTABILITY JUDGING REQUEST

1101

| REQUEST TYPE | BACKUP EXECUTABILITY JUDGING |
|---|---|
| POLICY ID | BK001 |

JUDGMENT RESULT

1201

| RESULT | BACKUP EXECUTABLE |
|---|---|
| DELETION TARGET BACKUP DATA | BK001_001 |

JUDGMENT RESULT (FILE BASIS)

1301    1302    1303    1304

| PATH NAME | BACKUP EXECUTABILITY | DELETION TARGET BACKUP DATA |
|---|---|---|
| /DIR1/FILE001 | BACKUP EXECUTABLE | BK001_001/DIR1/FILE001 |
| /DIR1/FILE002 | BACKUP INEXECUTABLE | |
| ⋮ | ⋮ | |
| /DIR1/FILE00N | BACKUP EXECUTABLE | BK001_002/DIR1/FILE00N |

*FIG. 13*

BACKUP SUCCESS NOTIFICATION 1401

| REQUEST TYPE | BACKUP SUCCESS NOTIFICATION | 1402 |
| --- | --- | --- |
| POLICY ID | BK001 | 1403 |
| BACKUP DATA ID | BK001_001 | 1404 |

FIG. 14

BACKUP CATALOGUE 0120

| POLICY ID | BK001 | 1502 |
| --- | --- | --- |
| BACKUP DESTINATION | MEDIA_GROUP001 | 1503 |
| BACKUP DATA ID | BK001_001 | 1504 |
| BACKUP ACQUISITION TIME | 2007/8/21 0:00 | 1505 |
| RETENTION TIME LIMIT | 2007/8/28 0:00 | 1506 |

FIG. 15

BACKUP EXECUTABILITY JUDGING SYSTEM

CLAIM OF PRIORITY

The present application claims priority from Japanese application JP2007-291697 filed on Nov. 9, 2007, the content of which is hereby incorporated by reference into this application.

BACKGROUND

This invention relates to control of data backup by a computer. In particular, the technique disclosed herein relates to lowering of the risk of a failure in restoration of necessary data due to the loss, by deletion, of normal backup data.

Backup software executes backup according to a backup policy created in advance by a system administrator.

A backup policy specifies a backup schedule, the original data location, backup destination storage, a backup data retention period, and the like.

The backup software makes a copy of original data and stores the copy as backup data in the backup destination storage at a backup timing defined in the backup schedule.

Since the backup destination storage has a limited capacity, the backup software deletes backup data that has passed its retention period (a time period in which backup data is kept) before storing new backup data in the backup destination storage. For example, in the case where a backup is taken daily, a week-old backup data may be deleted each time backup is executed.

A technique of predicting a backup result before backup is executed has been disclosed (see JP 2004-206611 A). According to JP 2004-206611 A, whether or not backup can be completed within a given period of time is judged before backup is executed, and a warning is issued when it is judged that backup is not going to be finished within the time limit.

Specifically, in JP 2004-206611 A, a history is kept which records the amount of data backed up and a time required for the backup, and a time required for the next backup is predicted based on the history. In the case where the predicted time exceeds a given threshold, a warning is issued. A user can tune the backup system according to the warning.

SUMMARY

A drawback of JP 2004-206611 A is that there is no way of finding out if data to be backed up is infected with a virus or if a user has made a significant change to a file by mistake. It is therefore impossible to avoid taking a backup of a virus-infected file or an erroneously changed file.

After the backup is executed, the user cannot restore the file to a state prior to the virus infection or the significant change because the previous backup data is deleted by executing the backup of the infected or erroneously changed file.

Another problem of prior art results from the use of a retention period set as a backup policy in determining which backup data is to be deleted upon taking a new backup. When there are backup data that is infected with a virus and backup data that has passed its retention period but is not infected with a virus, it is the backup data that has passed the retention period that is deleted in prior art. This leaves the virus-infected backup data and nullifies the original purpose of backup, which is to restore a normal file.

This invention has been made to solve the above problems, and it is therefore an object of this invention to provide a backup executability judging system which lowers the risk of a failure in restoring necessary data due to the loss, by deletion, of normal backup data.

According to a representative invention disclosed in this application, there is provided a computer system comprising a storage system coupled to a network, the storage system having one or more data storage devices containing a plurality of data storage areas, and a controller for controlling the data storage devices, the plurality of data storage areas including a first storage area and a second storage area for storing a copy of data that is stored in the first storage area at one point in time, the computer system further comprising a backup judging module, wherein the backup judging module is configured to judge whether or not a differential amount indicating a difference between data stored in the first storage area and data stored in the second storage area is smaller than a predetermined threshold, and wherein the storage system is configured to delete, only when the differential amount is smaller than the predetermined threshold, the data stored in the second storage area and newly store a copy of the data stored in the first storage area in the second storage area.

An embodiment of this invention makes it possible to avoid a situation in which a virus-infected file or an erroneously changed file is backed up while a normal backup file is deleted.

BRIEF DESCRIPTION OF THE DRAWINGS

FIG. 4 is an explanatory diagram showing an example of a backup policy management table according to the first embodiment of this invention.

FIG. 5 is an explanatory diagram showing an example of an execution condition table according to the first embodiment of this invention.

FIG. 6 is an explanatory diagram showing an example of a keyword management table according to the first embodiment of this invention.

FIG. 7 is an explanatory diagram showing an example of an index table according to the first embodiment of this invention.

FIG. 11 is an explanatory diagram showing an example of a format of a backup executability judging request according to the first embodiment of this invention.

FIG. 12 is an explanatory diagram showing an example of a format of a backup executability result according to the first embodiment of this invention.

FIG. 13 is an explanatory diagram showing, as a modification example of the format of the backup executability result, a backup executability result according to the first embodiment of this invention.

FIG. 14 is an explanatory diagram showing an example of a format of a backup success notification according to the first embodiment of this invention.

FIG. 15 is an explanatory diagram showing an example of a backup catalogue according to the first embodiment of this invention.

DETAILED DESCRIPTION OF THE PREFERRED EMBODIMENTS

First Embodiment

A backup executability judging system according to a first embodiment of this invention will be described below with reference to the drawings.

Figure 1:
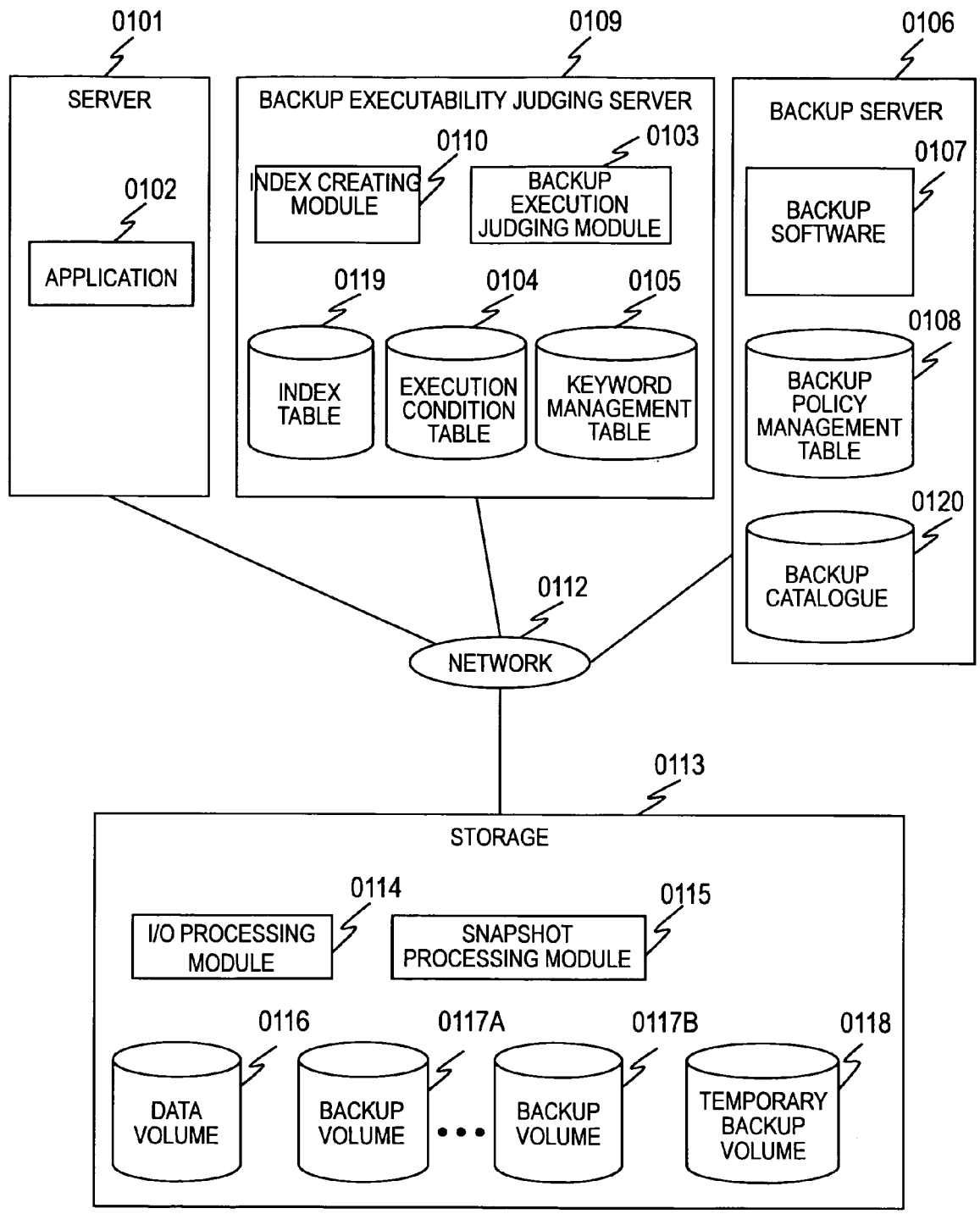
FIG. 1 is a block diagram showing a schematic configuration of a backup executability judging system according to a first embodiment of this invention.

FIG. 1 is a block diagram showing the schematic configuration of the backup executability judging system according to the first embodiment of this invention.

This system is composed of a server 0101, a backup executability judging server 0109, a backup server 0106, storage 0113, and a network 0112, which couples the components of the system to one another.

The network 0112 can be Ethernet or the Internet. TCP/IP may be employed as a communication protocol.

The server 0101 is a computer in which an application 0102 is run. The application 0102 stores data in the storage 0113 and refers to the stored data.

The backup executability judging server 0109 is a computer that compares application data against backup data to judge whether to delete the backup data and newly execute backup. The backup executability judging server 0109 has as its functions an index creating module 0110 and a backup execution judging module 0103. The backup executability judging server 0109 also holds an index table 0119, an execution condition table 0104, and a keyword management table 0105 as management information.

The backup server 0106 is a computer that executes data backup according to a backup policy. The backup server 0106 of this embodiment makes an inquiry to the backup executability judging server 0109 about whether or not backup is permitted to be executed before executing backup. Backup software 0107 is run in the backup server 0106. The backup software 0107 holds a backup policy management table 0108 and a backup catalogue 0120 as management information.

The storage 0113 is a data storage system that provides a function of processing a data access request (a request to store data or a request to refer to data) made by the server 0101 and a function of taking a snapshot in order to back up data. The storage 0113 of this embodiment is network attached storage (NAS), but this invention is also applicable to other types of storage system.

A data access request from the server 0101 is processed by an I/O processing module 0114.

Taking a snapshot means to copy data in a data volume 0116 at the time a snapshot request is received to backup volumes 0117A or 0117B or to a temporary backup volume 0118. The snapshot creating processing is executed by a snapshot processing module 0115. In the snapshot creating processing, data in the data volume 0116 of which a copy is made is referred to as original data. A copy of the original data which is made by the snapshot creating processing and stored in the back up volume 0117A or other volumes is also referred to as backup data.

In the following description, the backup volumes 0117A and 0117B are collectively referred to as backup volumes 0117 when there is no need to discriminate one from the other; the backup volumes 0117A and 0117B each constitute one of a plurality of backup volumes 0117.

FIG. 1 shows as an example the storage 0113 that contains one data volume 0116 and two backup volumes 0117. In practice, the storage 0113 may contain an arbitrary count of data volumes 0116 and an arbitrary count of backup volumes 0117.

The temporary backup volume 0118 is a volume to which data is temporarily backed up without deleting backup data when it is judged that backup is not executable (in other words, backup is not permitted).

The data volume 0116, the backup volumes 0117A and 0117B, and the temporary backup volume 0118 are each a storage area treated as one logical storage device by the I/O processing module 0114 and the snapshot processing module 0115.

This embodiment shows an example of utilizing a snapshot function of the storage 0113 in taking a backup of data. However, this invention is also applicable to host-based backup in which the backup server 0106 reads a file out of the data volume 0116 and a copy of the file is stored in the backup volume 0117A or other volumes.

Figure 2:
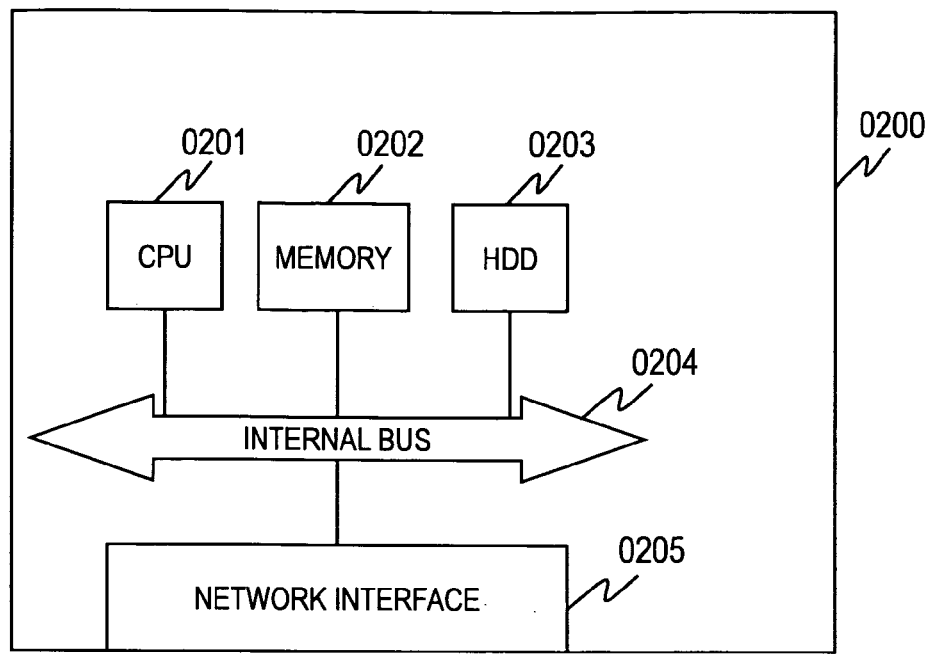
FIG. 2 is a block diagram showing a schematic hardware configuration of a server, a backup executability judging server and a schematic hardware configuration of a backup server according to the first embodiment of this invention.

FIG. 2 is a block diagram showing the schematic hardware configuration of the server 0101, the backup executability judging server 0109 and the schematic hardware configuration of the backup server 0106 according to the first embodiment of this invention.

The server 0101, the backup executability judging server 0109, and the backup server 0106 are each implemented by a computer 0200, which has a hardware configuration shown in FIG. 2.

Specifically, the computer 0200 implementing these servers has as its internal components a CPU 0201, a memory 0202, a hard disk drive (HDD) 0203, and a network interface 0205, which are coupled to one another by an internal bus 0204. The servers are coupled to the network 0112 through their respective network interfaces 0205 to communicate with each other and with the storage 0113.

The application 0102 is implemented by the CPU 0201 of the server 0101 by executing a not-shown program that is stored in the memory 0202 of the server 0101.

The index creating module 0110 and the backup execution judging module 0103 are implemented by the CPU 0201 of the backup executability judging server 0109 by executing a not-shown program that is stored in the memory 0202 of the backup executability judging server 0109. The index table 0119, the execution condition table 0104, and the keyword management table 0105 are stored in the memory 0202 of the backup executability judging server 0109.

The backup software 0107 is implemented by the CPU 0201 of the backup server 0106 by executing a not-shown program that is stored in the memory 0202 of the backup server 0106. The backup policy management table 0108 and the backup catalogue 0120 are stored in the memory 0202 of the backup server 0106.

The above programs, data of the above tables, and the like may be stored in the HDD 0203 to be copied to the memory 0202 as the need arises.

Figure 3:
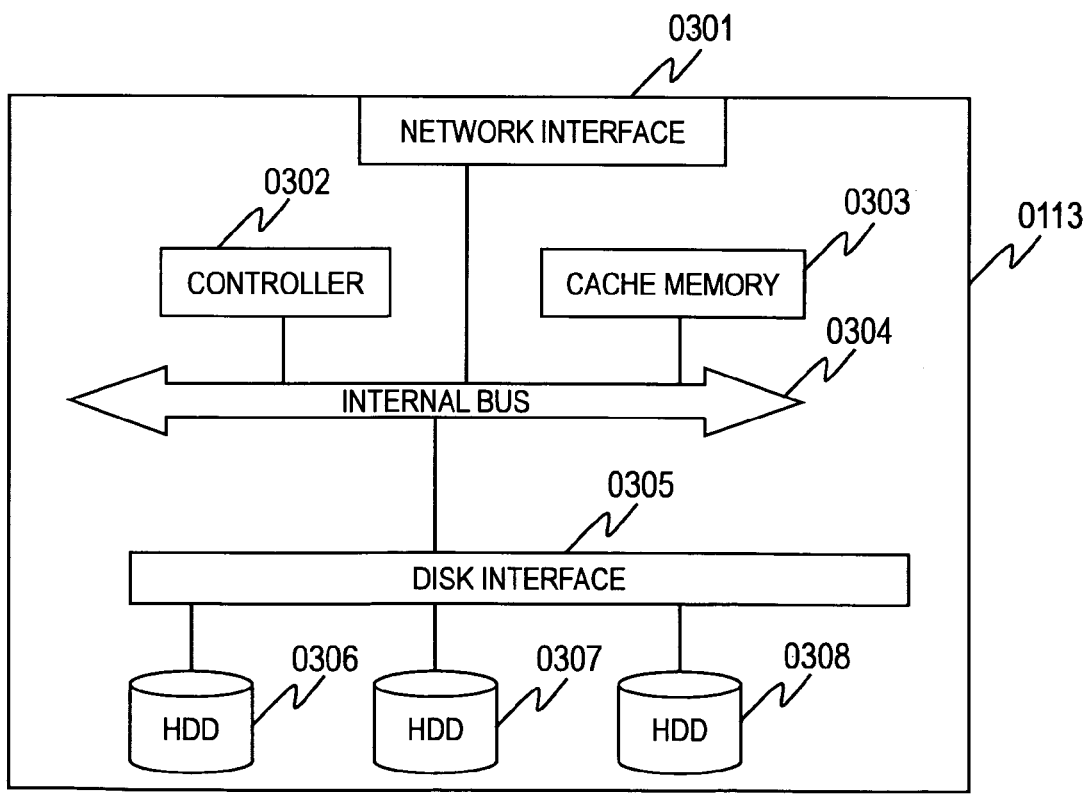
FIG. 3 is a block diagram showing a schematic hardware configuration of a storage according to the first embodiment of this invention.

FIG. 3 is a block diagram showing the schematic hardware configuration of the storage 0113 according to the first embodiment of this invention.

The storage 0113 has a network interface 0301, a controller 0302, a cache memory 0303, a disk interface 0305, and one or more HDDs, here 0306, 0307 and 0308. These components except the HDDs 0306, 0307, and 0308 are intercoupled by an internal bus 0304. The storage 0113 is coupled to the network 0112 via the network interface 0301 to communicate with various servers.

The HDDs 0306, 0307, and 0308 contain a plurality of storage areas where data is stored. Each storage area is allocated to one of the data volume 0116, the backup volumes 0117A and 0117B, and the temporary backup volume 0118.

The I/O processing module 0114 and the snapshot processing module 0115 are implemented by the controller 0302. For example, a not-shown CPU within the controller 0302 executes a program stored in a not-shown memory within the controller 0302 to implement the I/O processing module 0114 and the snapshot processing module 0115. Processing that is executed by the I/O processing module 0114 and the snapshot processing module 0115 in any embodiment of this invention is therefore actually executed by the controller 0302.

FIG. 4 is an explanatory diagram showing an example of the backup policy management table 0108 according to the first embodiment of this invention.

A backup policy is settings information that specifies which data is to be backed up, when and to where the data is to be backed up, and how long the backup data is to be kept.

The backup policy management table 0108 has entries each composed of a policy ID 0402, a backup source 0403, a backup destination 0404, a schedule 0405, and a retention period 0406.

The policy ID 0402 indicates a unique ID (identifier) used to discriminate one backup policy from another.

The backup source 0403 indicates where original data is stored. As the backup source 0403, a folder, a file system, a volume, or the like that stores original data is entered. In the example of FIG. 4, "ORIG001" and other values stored as the backup source 0403 are the identifiers of file systems. One file system is stored in one data volume 0116 in this embodiment.

The backup destination 0404 indicates where backup data is stored. To take a snapshot of the data volume 0116, as many backup volumes 0117 as the count of generations of backup data to be kept are prepared. Groups of the prepared backup volumes 0117 are managed as backup destinations of the data volume 0116.

For instance, in the case where three generations of backup data of one data volume 0116 are to be kept, a group of three backup volumes 0117 is prepared as the backup destination of the data volume 0116. The identifier of such a group of backup volumes 0117 is entered as the backup destination 0404.

The schedule 0405 indicates a scheduled time to start executing backup.

As the retention period 0405, a length of time during which obtained backup data has to be kept is set. Backup data is considered as deletable data once a time period indicated by the retention period 0405 passes.

In the example of FIG. 4, "ORIG001", "MEDIA_GROUP001", "everyday at noon", and "one week" are written as the backup source 0403, the backup destination 0404, the schedule 0405, and the retention period 0406, respectively, in an entry that holds a value "BK001" as the policy ID 0402. This shows that data stored in a file system "ORIG001" is backed up to one of the backup volumes 0117 that belong to a group identified by "MEDIA_GROUP001", that this backup is executed everyday at noon, and that the backup data is kept for one week from the date of the backup.

FIG. 5 is an explanatory diagram showing an example of the execution condition table 0104 according to the first embodiment of this invention.

The execution condition table 0104 is a table that specifies a condition for judging if backup data that has passed its retention period can be deleted from one of the backup volumes 0117 where the backup data has been kept in preparation for storing new backup data in this backup volume 0117.

The execution condition table 0104 has entries each composed of a policy ID 0502, a differential condition 0503, and a deletion policy 0504.

The policy ID 0502 indicates the policy ID 0402 of the backup policy management table 0108. Execution conditions can be set for each backup policy.

As the differential condition 0503, a threshold for the differential amount is set which is used in judging whether to execute backup. The differential amount indicates the difference between original data stored in the data volume 0116 and backup data stored in one of the backup volumes 0117, and is calculated by a predetermined calculation formula. For example, if the differential amount 0503 is "100", backup is executed (in other words, back up is permitted) when the calculated differential amount is smaller than 100.

A condition for selecting backup data to be deleted when a new backup is taken is set as the deletion policy 0504. In the case where the deletion policy 0504 is "according to the retention period", the oldest backup data (backup data that has the earliest creation date) of the ones that have passed their retention periods is deleted. In the case where the deletion policy 0504 is "the smallest differential amount", backup data that has the smallest differential amount of the ones that have passed their retention periods is deleted.

FIG. 6 is an explanatory diagram showing an example of the keyword management table 0105 according to the first embodiment of this invention.

The keyword management table 0105 is a table that holds for each piece of backup data keywords contained in the backed up file and the appearance counts of the keywords. The keyword management table 0105 is referred to in calculating the differential amount which indicates the difference between data to be backed up (original data of which a backup is about to be taken) and backup data.

The keyword management table 0105 has entries each composed of a policy ID 0601, a backup data ID 0602, a path name 0603, a keyword 0604, and a keyword appearance count 0605.

The policy ID 0601 indicates which backup policy is employed in obtaining backup data. Specifically, the policy ID 0601 indicates the policy ID 0402 of the backup policy management table 0108.

The backup data ID 0602 is information for identifying backup data. For example, in the case where a plurality of files are backed up together by the tape archival and retrieval format (TAR), the backup data ID 0602 indicates where the TAR file is stored. In the case where a snapshot is taken, the backup data ID 0602 indicates the identifier of the backup volume 0117 that stores the snapshot.

The path name 0603 indicates a path name of each backup file (files contained in the backup volumes 0117), and is used to identify each individual file.

The keyword 0604 indicates a keyword that appears in the respective files.

The keyword appearance count 0605 indicates how many times a keyword appears in one file.

For example, an entry 0606 shows that a keyword "Hitachi" appears twenty-three times in a file "/DIR1/FILE001" contained in backup data "BK001_001", which is obtained according to a backup policy "BK001".

FIG. 7 is an explanatory diagram showing an example of the index table 0119 according to the first embodiment of this invention.

The index table 0119 is a table that holds for each data to be backed up keywords contained in a file within the data to be backed up and the appearance counts of the keywords.

The index table 0119 has entries each composed of source storage 0701, an index creation time 0702, a path name 0703, a keyword 0704, and a keyword appearance count 0705.

The source storage 0701 indicates where data for which an index is created is stored. In this embodiment, the backup source 0403 specified by a backup policy corresponds to the source storage 0701.

The index creation time 0702 indicates a time at which an entry regarding to data that is stored in a location indicated by the source storage 0701 is updated in the index table 0119. The index table 0119 in this embodiment is updated at least once between the last time backup is finished and the next time backup is started.

The path name 0703 indicates a path name of each file that is stored in a location indicated by the source storage 0701.

The keyword 0704 and the keyword appearance count 0705 indicate a keyword that appears in the respective files and how many times the keyword appears in one file, respectively, similarly to the keyword 0604 and the keyword appearance count 0605 in the keyword management table 0105.

Processing executed in this embodiment will be described next.

The backup software 0107 makes an inquiry to the backup executability judging server 0109 about whether or not backup is permitted to be executed before taking a backup as scheduled by a backup policy. When backup is executable (in other words, when backup is permitted), the backup software 0107 deletes backup data determined by the backup executability judging server 0109, and then executes backup. When backup is not executable (in other words, when backup is not permitted), the backup software 0107 aborts backup.

Figure 8:
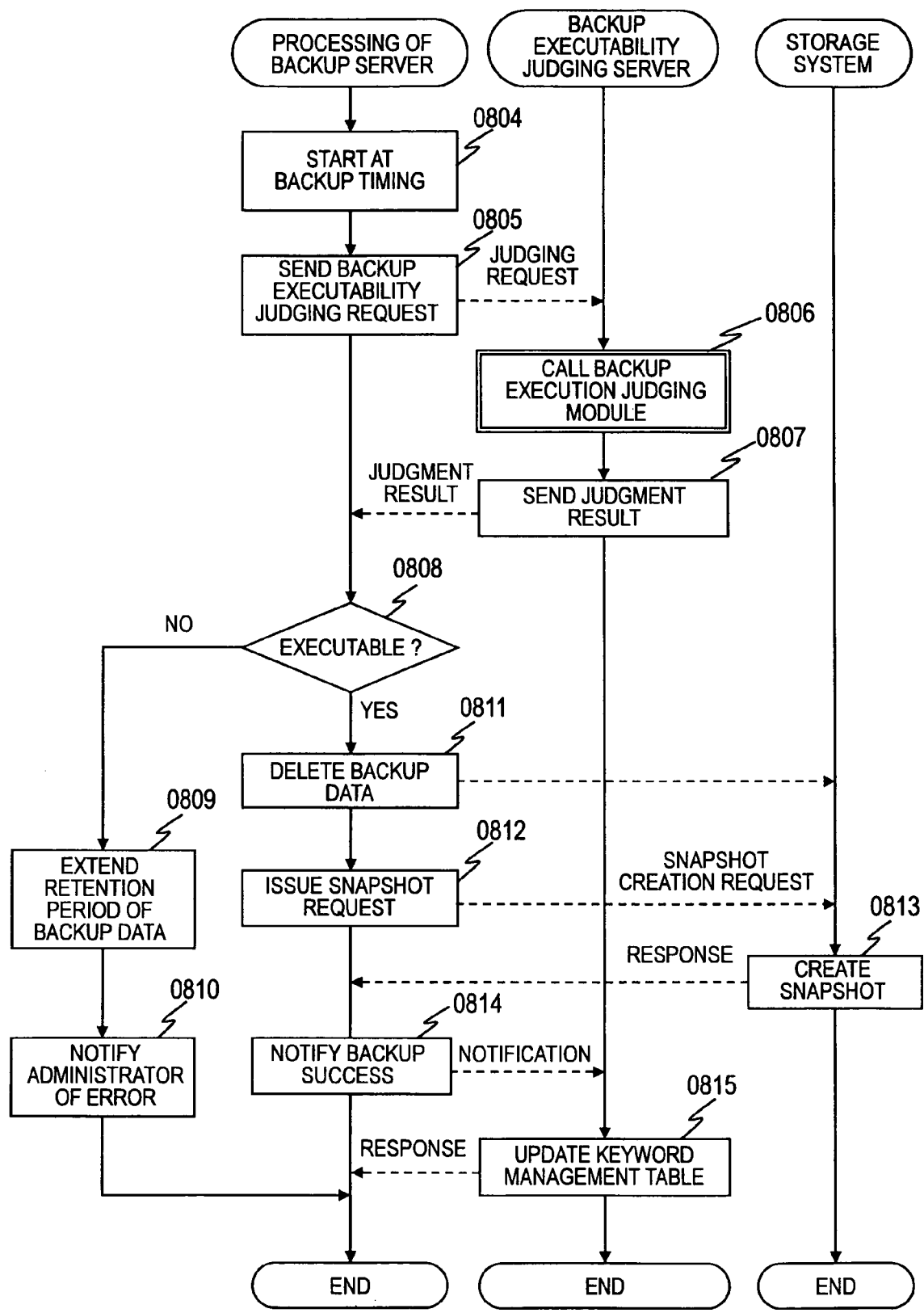
FIG. 8 is a flow chart showing a series of processing steps that is executed by backup software according to the first embodiment of this invention.

FIG. 8 is a flow chart showing a series of processing steps that is executed by the backup software 0107 according to the first embodiment of this invention.

Of processing steps shown in FIG. 8, one executed by the backup server 0106 is executed by the backup software 0107 of the backup server 0106. More strictly speaking, this processing is implemented by the CPU 0201 of the backup server 0106 by executing the backup software 0107 which is stored in the memory 0202 within the backup server 0106.

First, the backup server 0106 starts the process as scheduled by a backup policy (Step 0804). The backup server 0106 designates the backup policy ID 0402 at this point.

For example, when backup policies are set as shown in FIG. 4, the backup server 0106 is booted up at noon everyday and designates "BK001" as the policy ID 0402, and booted up once a week and designates "BK002" as the policy ID 0402.

The booted backup server 0106 issues a backup executability judging request to the backup executability judging server 0109 (Step 0805). An example of the format of the request is shown in FIG. 11. The request format contains the policy ID designated in Step 0804.

Receiving the backup executability judging request, the backup executability judging server 0109 calls up the backup execution judging module 0103 (Step 0806). The called up backup execution judging module 0103 executes processing shown in FIG. 9.

The backup executability judging server 0109 sends the result of the judgment to the backup server 0106 (Step 0807). The format of the judgment result is shown in FIG. 12. The judgment result contains an answer about the executability and the ID of backup data designated to be deleted.

The backup server 0106 interprets the backup executability judgment result (Step 0808). When it is judged that backup is not executable, the backup server 0106 executes Step 0809. When it is judged that backup is executable, the backup server 0106 executes Step 0811.

When it is judged in Step 0808 that backup is not executable, it means that original data about to be backed up might contain data that results from a virus infection, misoperation by a user, or the like and should not be backed up. In other words, backup data that is deleted by executing this backup may contain a backup of correct data taken before the virus infection or the like.

The backup server 0106 does not execute the requested backup in this case. In other words, the backup server 0106 does not delete backup data that has passed its retention period and would have been deleted should the requested backup have been executed.

Instead, the backup server 0106 extends the retention period of the expired backup data (the backup data that would have been deleted should the requested backup have been executed) to the next time backup is executed (Step 0809). The backup server 0106 may execute the processing of deleting backup data that has passed its retention period regularly in addition to the time when backup is executed. In this case, too, the retention period is extended in order to stall deletion of backup data until the administrator finishes confirming.

Next, the backup server 0106 notifies the administrator of the fact that backup has not been executed as scheduled (Step 0810). This notification may be made by, for example, sending E-mail from the backup server 0106 to the administrator. The processing is thus ended.

When it is judged in Step 0808 that backup is executable, on the other hand, it means that original data about to be backed up does not contain data that should not be backed up (e.g., data that results from a virus infection, misoperation by a user, or the like). Then the backup server 0106 sends an instruction to the storage 0113 to delete backup data designated by the backup executability judging server 0109 (Step 0811). The storage 0113 deletes the designated snapshot in the case where backup is executed with the use of the snapshot function of the storage 0113.

The backup server 0106 next issues a snapshot request to the storage 0113 (Step 0812).

This embodiment describes a case in which data is backed up with the use of the snapshot function of the storage 0113. However, this invention is also applicable to a case where the backup server 0106 itself executes host-based backup on a file-by-file basis. In this case, file-basis backup is executed in Step 0811, Step 0812, and Step 0813. For example, depending on the backup executability result that is issued for each file in a format shown in FIG. 13, the backup server 0106 deletes deletion target backup data 1304 that is associated with the backup executable file, reads the backup executable file out of the data volume 0116, and then stores a copy of the read file in the backup volume 0117.

The storage 0113 takes a snapshot as requested by the snapshot request, and sends a result to the backup server 0106 (Step 0813).

Receiving the result, the backup server 0106 notifies the backup executability judging server 0109 of the backup success (Step 0814). This notification is sent in order to copy the contents of the index table 0119 at the time the backup is taken to the keyword management table 0105, which keeps the copy as a record. The format of the backup success notification is shown in FIG. 14.

The backup executability judging server 0109 receives the backup success notification and adds one entry to the keyword management table 0105. The backup executability judging server 0109 copies a policy ID 1403 and a backup data ID 1404 that are contained in the backup success notification as shown in FIG. 14 to the added entry as the policy ID 0601 and the backup data ID 0602 (Step 0815). The backup executability judging server 0109 also copies the path name 0703, keyword 0704, and keyword appearance count 0705 of the index table 0119 that have been stored temporarily by the backup execution judging module 0103 to the added entry as the path name 0603, the keyword 0604, and the keyword appearance count 0605. The temporary storage by the backup execution judging module 0103 will be described with reference to FIG. 9 (Step 0907). The processing is thus completed.

In the above example, neither deletion of backup data nor creation of new backup data (i.e., snapshot) is executed when it is judged in Step 0808 that backup is not executable. Alternatively, when it is judged in Step 0808 that backup is not executable, new backup data may be created in Step 0810 and stored in the temporary backup volume 0118 while keeping old backup data. If the new backup data is found to contain data that has been changed by a virus infection or the like, the new backup data is deleted and the old backup data is used in restoration.

Figure 9:
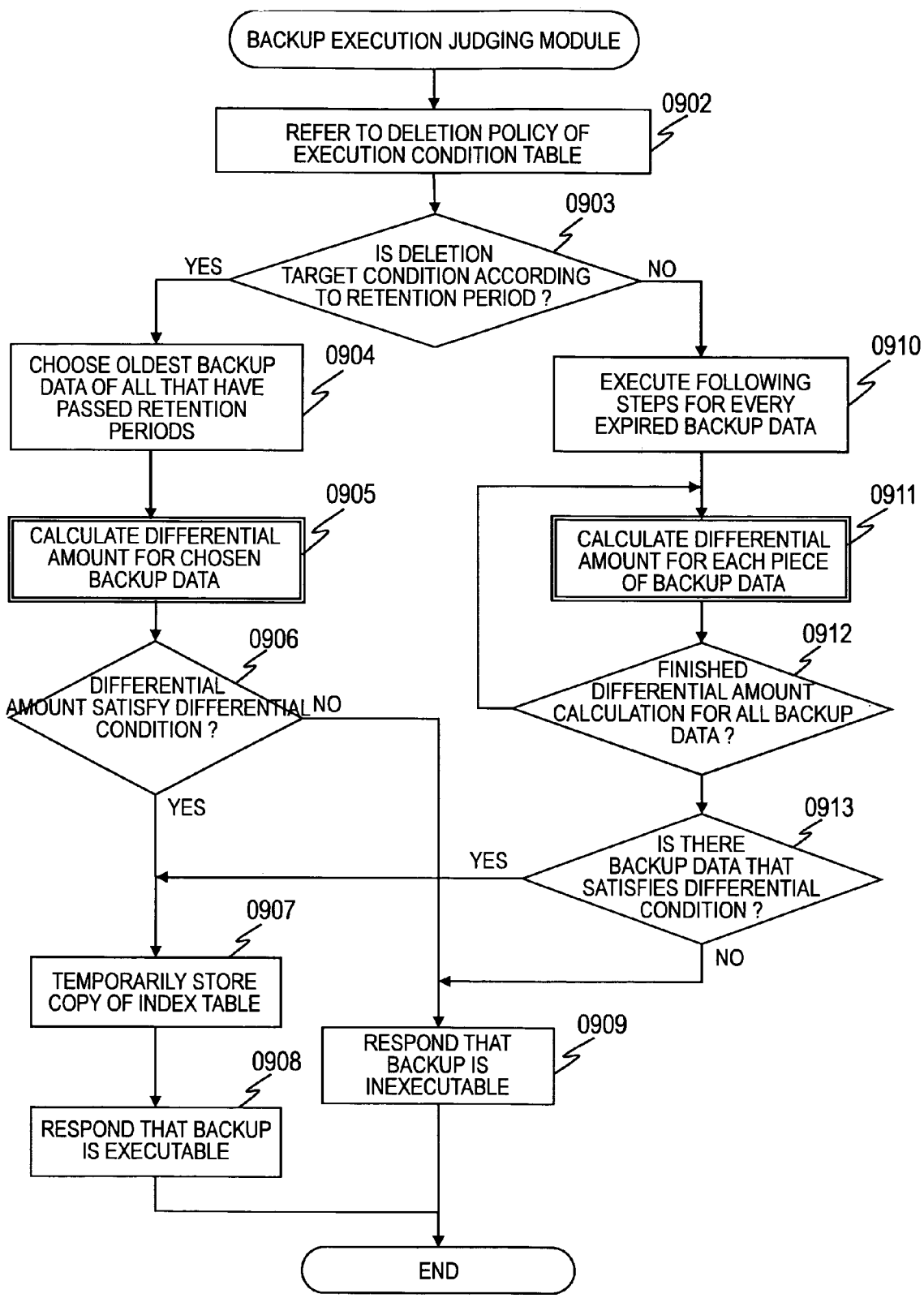
FIG. 9 is a flow chart showing processing that is executed by a backup execution judging module according to the first embodiment of this invention.

FIG. 9 is a flow chart showing processing that is executed by the backup execution judging module 0103 according to the first embodiment of this invention.

The processing shown in FIG. 9 branches into different paths depending on whether backup data to be deleted is the oldest backup data among all that have passed their retention periods or backup data that has passed its retention period and satisfies execution conditions. Which path is to be taken at the branch is determined based on the deletion policy 0504 of the execution condition table 0104. The backup execution judging module 0103 compares deletion candidate backup data against data to be backed up, to thereby judge whether or not execution conditions are met.

The processing of the backup execution judging module 0103 will be described below with reference to FIG. 9. This processing is called up in Step 0806 of FIG. 8. The processing shown in FIG. 9 is implemented by the CPU 0201 of the backup executability judging server 0109 by executing a program that is stored in the memory 0202 of the backup executability judging server 0109.

First, the backup executability judging server 0109 refers to the deletion policy 0504 in an entry of the execution condition table 0104 that holds the specified policy ID (Step 0902).

Next, the backup executability judging server 0109 judges whether or not the deletion policy 0504 is "according to the retention period" (Step 0903). When the deletion policy 0504 is "according to the retention period", the backup executability judging server 0109 executes Step 0904. When the deletion policy 0504 is "the smallest differential amount", the backup executability judging server 0109 executes Step 0910.

The backup executability judging server 0109 refers to the backup catalogue 0120 of the backup server 0106 and chooses, from among backup data created under a backup policy that is identified by the designated policy ID, one that has passed its retention period and that has the earliest creation date (i.e., the oldest backup data) (Step 0904).

The backup executability judging server 0109 calculates a differential amount that indicates the difference between the backup data chosen in Step 0904 and original backup data about to be backed up (backup target data) (Step 0905). How the differential amount is calculated will be described with reference to FIG. 10.

Next, the backup executability judging server 0109 refers to the differential condition 0503 of the execution condition table 0104 to judge whether or not the differential amount calculated in Step 0905 meets the condition (Step 0906).

When the differential amount meets the condition, it is considered that the backup target data is not invalid data resulting from a virus infection, misoperation by a user, or the like. Then the backup executability judging server 0109 executes Step 0907. When the differential amount does not meet the condition, it is considered that the backup target data contains invalid data resulting from a virus infection, misoperation by a user, or the like. Taking a backup of such data and deleting old backup data in order to take a backup of such data are not desirable. The backup executability judging server 0109 executes Step 0909 in this case.

In Step 0907 which is executed when the differential amount meets the condition, the backup executability judging server 0109 looks up the index table 0119 for information about the backup target data that is associated with the designated policy ID, and temporarily stores the information in the memory 0202.

The backup executability judging server 0109 then sends a judgment result that says "backup is executable" in response to the request (Step 0908). The judgment result specifies the oldest backup data of all that have passed their retention periods as deletion target backup data 1203 as shown in FIG. 12.

In Step 0909 which is executed when the differential amount does not meet the condition, the backup executability judging server 0109 sends a judgment result that says "backup is inexecutable" in response to the request.

When the deletion policy 0504 is "the smallest differential amount" in Step 0903, the backup executability judging server 0109 refers to the backup policy management table 0108 and the backup catalogue 0120, which are managed by the backup server 0106, to retrieve backup data that has passed its retention period from among backup data created under a backup policy that is identified by the designated policy ID (Step 0910). For each piece of backup data retrieved as a result, the backup executability judging server 0109 executes Step 0911 and subsequent steps.

In Step 0911, the backup executability judging server 0109 calculates a differential amount that indicates the difference between each piece of the retrieved backup data and the backup target data. How the differential amount is calculated will be described with reference to FIG. 10. The result of the calculation is recorded for each piece of backup data in a not-shown table.

The backup executability judging server 0109 next judges whether or not the differential amount calculation has been finished for every piece of backup data that has been retrieved and that has passed its retention period (Step 0912). When the differential amount calculation is finished for all the retrieved and expired backup data, the backup executability judging server 0109 executes Step 0913. When the differential amount calculation is not finished yet for all the retrieved and expired backup data, the backup executability judging server 0109 repeats Step 0911 to process the next backup data.

The backup executability judging server 0109 identifies which backup data satisfies the differential condition 0503 of the execution condition table 0104 out of the backup data for which the differential amount calculation has been finished (Step 0913).

When there is at least one piece of backup data that meets the differential condition 0503, the backup executability judging server 0109 executes Step 0907. Backup data identified in Step 0913 is the deletion target backup data 1203.

When a plurality of pieces of backup data are identified in Step 0913 as backup data that satisfies the differential condition 0503, the one that has the smallest differential amount calculated, or the oldest one, of all those pieces of backup data may be designated as the deletion target backup data 1203.

When no backup data meets the differential condition 0503, the backup executability judging server 0109 executes Step 0909.

Figure 10:
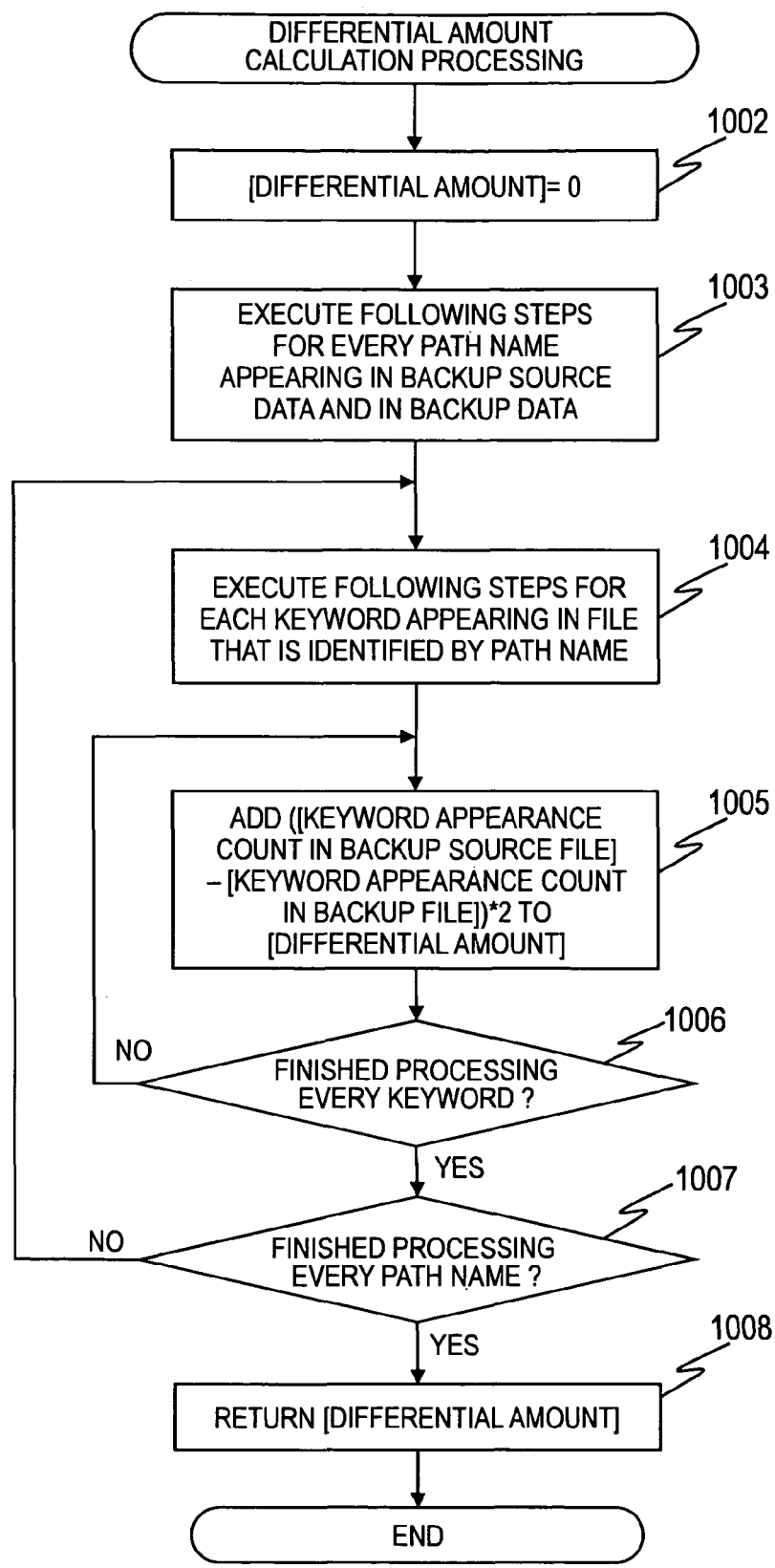
FIG. 10 is a flow chart showing differential amount calculation processing according to the first embodiment of this invention.

FIG. 10 is a flow chart showing differential amount calculation processing according to the first embodiment of this invention.

This processing is for calculating the degree of inconsistency between data to be backed up and deletion target backup data as the differential amount of the two. The degree of data inconsistency is calculated based on difference in keywords in the files and the differing appearance counts of a keyword. This processing is executed in Step 0905 and Step 0911 of FIG. 9 by the backup execution judging module 0103 of the backup executability judging server 0109.

First, the backup executability judging server 0109 initializes the value of the parameter [differential amount] with "0" (Step 1002). The parameter [differential amount] may be stored in, for example, the memory 0202 of the backup executability judging server 0109.

Next, the backup executability judging server 0109 lists all path names that appear in at least one of backup target data and backup data compared with this backup target data (Step 1003). The path names are listed by referring to the path name 0703 of the index table 0119 and the path name 0603 of the keyword management table 0105.

Specifically, the path name 0703 is extracted from every entry in the table of FIG. 7 that holds the backup source 0403 (storage source 0701) associated with the designated policy ID 0402, the path name 0603 is extracted from every entry in the table of FIG. 6 that holds the ID 0602 of the compared backup data, and the extracted path names are put on the list.

When the processing of FIG. 10 is executed in Step 0905, the compared backup data is the backup data chosen in Step 0904. When the processing of FIG. 10 is executed in Step 0911, the compared backup data is one of backup data retrieved in Step 0910.

Step 1004 and subsequent steps are executed for all of the path names listed in Step 1003.

The backup executability judging server 0109 executes Step 1005 and subsequent steps for all keywords that appear in each file identified by a path name on the list (Step 1004). Specifically, Step 1005 is executed for each of the keywords that appear to process one keyword at a time. The keywords that appear are obtained by extracting the keyword 0704 from every entry in the index table 0119 that holds a path name on the list and the keyword 0604 from every entry in the keyword management table 0105 that holds a path name on the list.

The backup executability judging server 0109 squares ([the keyword appearance count in the backup source file]−[the keyword appearance count in the backup file]), and adds the result to the parameter [differential amount] (Step 1005). The keyword appearance count in the backup source file is calculated from the keyword 0704 of the index table 0119. The keyword appearance count in the backup file is calculated from the keyword 0604 of the keyword management table 0105. In the case where a keyword appears only one of the two files compared against each other, the appearance count of the keyword in the other file is counted as zero.

In Step 1005, the absolute value of ([the keyword appearance count in the backup source file]−[the keyword appearance count in the backup file]) may be added instead of the square of ([the keyword appearance count in the backup source file]−[the keyword appearance count in the backup file]).

Next, the backup executability judging server 0109 judges whether or not Step 1005 has been finished for all keywords that appear in any file on the list (Step 1006). When Step 1005 is finished for all of the keywords, the difference in appearance count between one of the files on the list and its corresponding backup source file has now been obtained for each of the keywords, and the appearance count difference calculated for each of the keywords has been added up to obtain the total count difference of all the keywords. Then the processing proceeds to Step 1007. Otherwise the processing returns to Step 1005, where the next keyword is processed.

The backup executability judging server 0109 next judges whether or not Step 1004 to Step 1006 have been finished for every file that is identified by any path name on the list (Step 1007). When Step 1004 to Step 1006 are finished for all of the path names, the difference in appearance count of keywords between the backup target data and backup data has now been obtained for each of the keywords, and the appearance count difference calculated for each of the keywords has been added up to obtain the total count difference of all the keywords. Then the processing proceeds to Step 1008. Otherwise the processing returns to Step 1004, where the next path name is processed.

The backup executability judging server 0109 then sends the value of the parameter [differential amount] as the result of the differential amount calculation (Step 1008). The processing is thus completed.

FIG. 11 is an explanatory diagram showing an example of the format of a backup executability judging request 1101 according to the first embodiment of this invention.

The backup executability judging request 1101 contains a request type 1102 and a policy ID 1103. As the request type 1102, "backup executability judgment" is written, which shows that this request is a backup executability judging request. The ID of a backup policy employed in backup to be executed, for example, "BK001", is set as the policy ID 1103.

FIG. 12 is an explanatory diagram showing an example of the format of a backup executability result 1201 according to the first embodiment of this invention.

The backup executability result 1201 is composed of a result 1202 and deletion target backup data 1203. Entered as the result 1202 is a judgment made by the backup execution judging module 0103. Specifically, "backup executable" is set as the result 1202 in the backup executability result 1201 that is sent in Step 0908. In the backup executability result 1201 that is sent in Step 0909, "backup inexecutable" is set as the result 1202.

The deletion target backup data 1203 is valid only when the result 1202 is "backup executable", and indicates which backup data is to be deleted by taking a new backup. For instance, when the deletion target backup data 1203 is "BK001_001", backup data stored in the backup volume 0117 that is identified by "BK001_001," is deleted in Step 0811, and new backup data (newly taken snapshot) is stored in this backup volume 0117 in Step 0812.

FIG. 13 is an explanatory diagram showing, as a modification example of the format of the backup executability result 1202, a backup executability result 1301 according to the first embodiment of this invention.

While this embodiment takes as an example backup that uses the snapshot function of the storage 0113, this invention is also applicable to host-based backup on a file-by-file basis. In file-basis backup, backup control of finer granularity is accomplished by judging the executability of backup for each file.

To judge backup executability for each file, the value calculated in Step 1005 of FIG. 10 is summed up for each file (more strictly, for each piece of data associated with a file that is identified by any path name on the list). Whether or not the differential amount meets the differential condition 0503 is then judged for each file in Step 0906 or Step 0913 of FIG. 9. The value set as the differential condition 0503 in this case is one that is appropriate for the differential amount summed up for each file. The result of this judgment is reflected on the backup executability result 1301 shown in FIG. 13.

Shown in FIG. 13 is an example of the file-basis backup executability result 1301 which is sent from the backup execution judging module 0103 in response to a backup executability judging request in the case where the executability of backup is judged for each file. The backup executability result 1301 is composed of a path name 1302, backup executability 1303, and deletion target backup data 1304.

The path name 1302 indicates a file that is stored in the data volume 0116 and is about to be backed up. The backup executability 1303 indicates whether or not backup of a file identified by the path name 1302 is permitted. The deletion target backup data 1304 indicates a file within the backup volume 0117 that is to be deleted when backup of a file identified by the path name 1302 is permitted and executed.

FIG. 14 is an explanatory diagram showing an example of the format of a backup success notification 1401 according to the first embodiment of this invention.

The backup success notification 1401 is sent from the backup server 0106 in Step 0814 of FIG. 8. The backup success notification 1401 contains a request type 1402, a policy ID 1403, and a backup data ID 1404.

As the request type 1402, "backup success notification" is written, which is information indicating that this notification is the backup success notification 1401. The policy ID 1403 indicates a backup policy employed in the executed backup. The backup data ID 1404 indicates the identifier of data backed up.

FIG. 15 is an explanatory diagram showing an example of the backup catalogue 0120 according to the first embodiment of this invention.

The backup catalogue 0120 is specific to each piece of backup data (for example, is prepared for each backup volume 0117). The backup catalogue 0120 of one piece of backup data is composed of a policy ID 1502, a backup destination 1503, a backup data ID 1504, a backup acquisition time 1505, and a retention time limit 1506.

The policy ID 1502 indicates the ID of a backup policy employed in executed backup. The backup destination 1503 indicates the identifier of a group to which the backup volume 0117 that stores the backup data belongs. The backup data ID 1504 indicates an ID used to identify the backup data, for example, the identifier of the backup volume 0117 that stores the backup data. The backup acquisition time 1505 indicates a time at which the backup is taken. The retention time limit 1506 indicates the end of a period during which the backup data has to be kept. Specifically, the retention time limit 1506 is calculated by adding the retention period 0405 that is associated with the policy ID 1502 to the backup acquisition time 1505.

Figure 16:
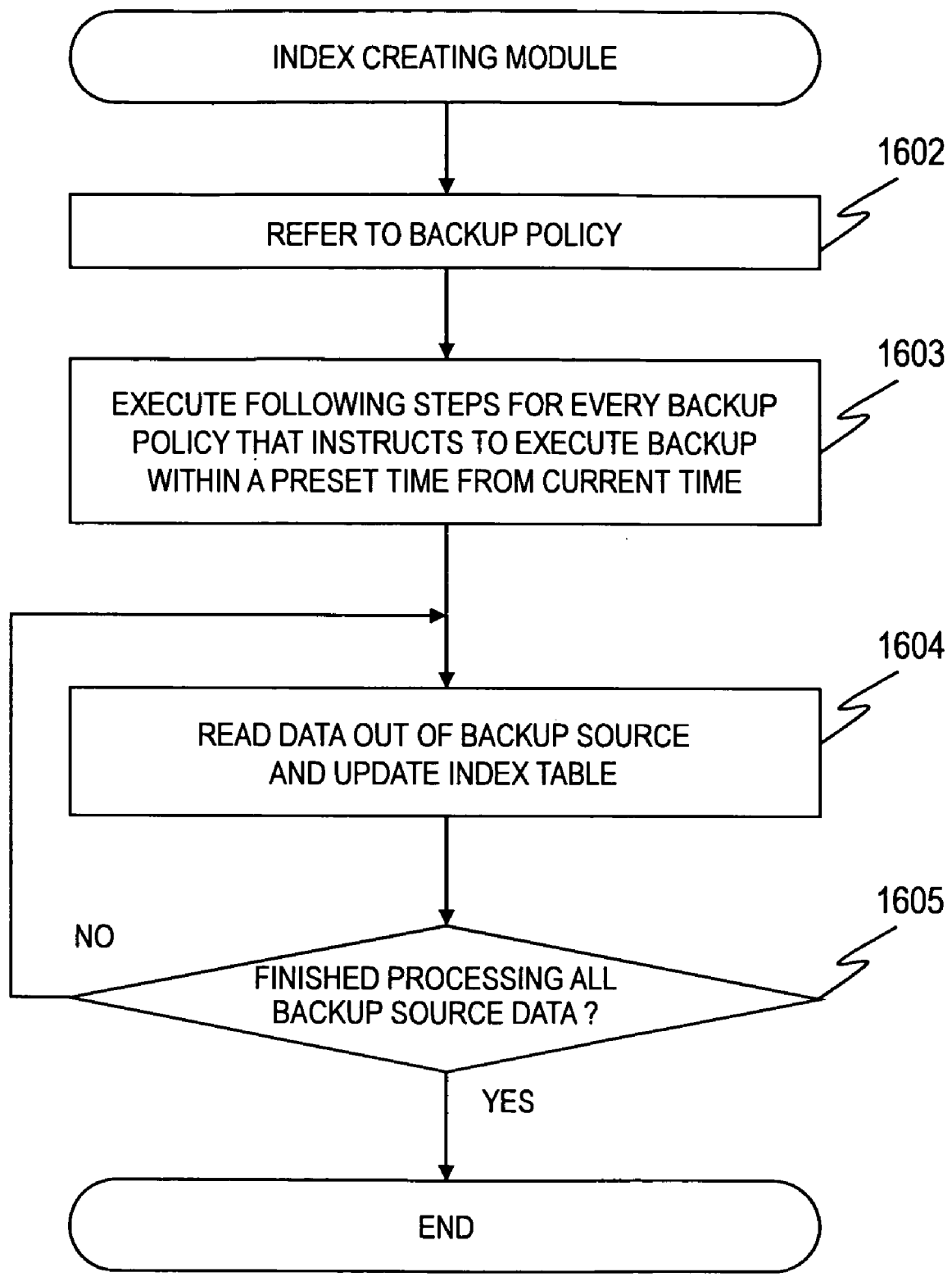
FIG. 16 is a flow chart showing processing that is executed by an index creating module of the backup executability judging server according to the first embodiment of this invention.

FIG. 16 is a flow chart showing processing that is executed by the index creating module 0110 of the backup executability judging server 0109 according to the first embodiment of this invention.

The index creating module 0110 is activated regularly to execute the processing shown in FIG. 16 and thereby create the index table 0119 of data to be backed up.

The processing shown in FIG. 16 is implemented by the CPU 0201 of the backup executability judging server 0109 by executing a program that is stored in the memory 0202 of the backup executability judging server 0109.

First, the backup executability judging server 0109 refers to the backup policy management table 0108 managed by the backup server 0106 (Step 1602).

Next, the backup executability judging server 0109 executes Step 1604 and subsequent steps for any backup policy in the backup policy management table 0108 that instructs to start backup before a predetermined length of time passes from the current time (Step 1603). When the backup policy management table 0108 has no backup policy that meets this criterion, the processing is ended. For example, in the case where one backup policy instructs to start backup at six a.m. and sets the predetermined length of time to two hours, and the current time is between four a.m. and six a.m., backup is started before the predetermined length of time passes from the current time. Then Step 1604 and subsequent steps are performed on the backup source 0403 of this backup policy.

In Step 1604, the backup executability judging server 0109 reads data out of the data volume 0116 indicated by the backup source 0403 of a backup policy that meets the criterion of Step 1603, and counts a keyword contained in the read data to update the index table 0119.

The backup executability judging server 0109 judges whether or not the updating of the index table 0119 has been finished for every backup policy whose index is to be updated (Step 1605). When the updating is finished, the processing is ended. When the updating is not finished yet, Step 1604 is repeated.

As a result of executing Step 1603 and Step 1604, the index table 0119 of one piece of data to be backed up is updated at least once within a time period between the completion of backup of the data to be backed up and the start of the next backup.

Second Embodiment

Figure 17:
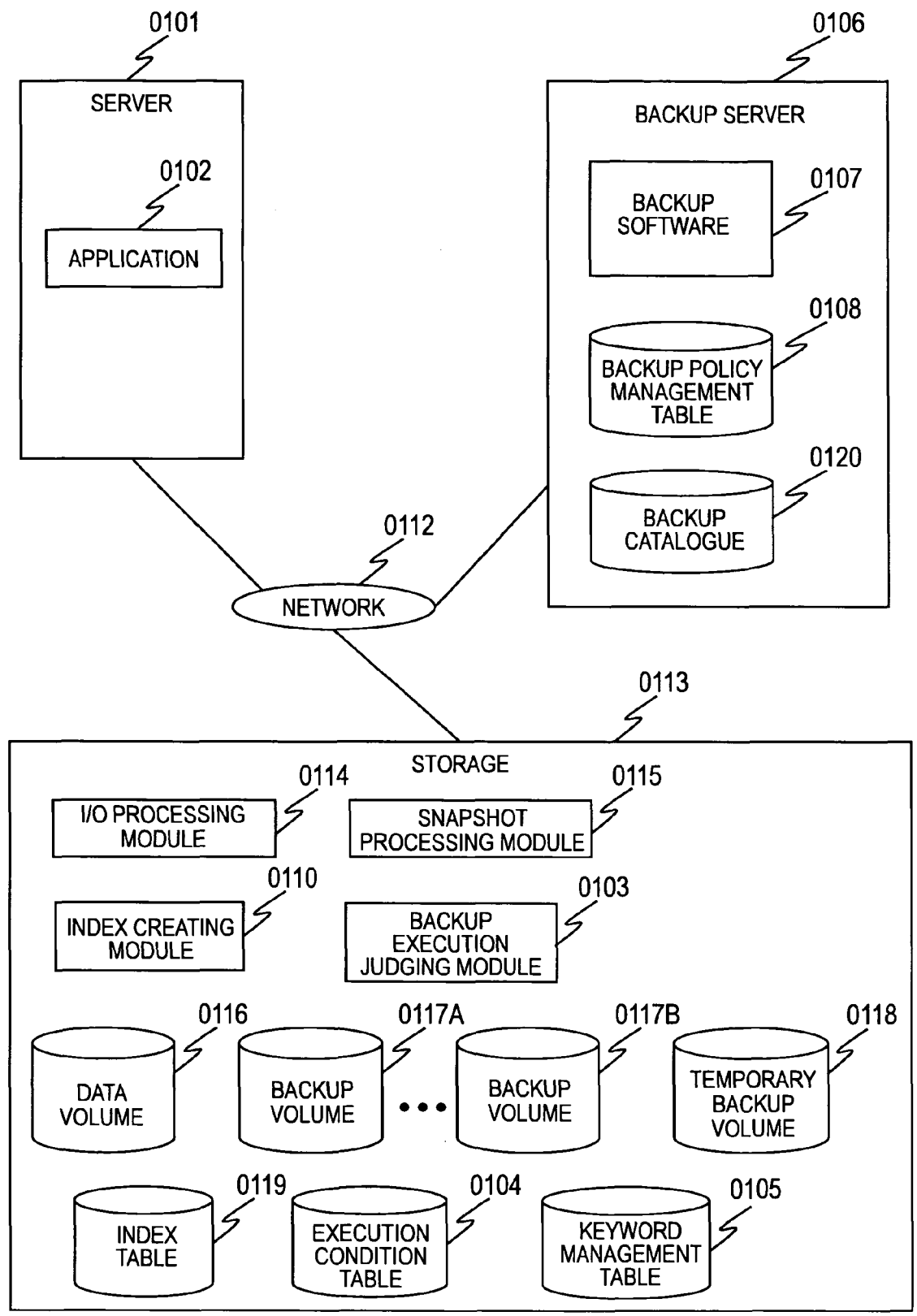
FIG. 17 is a block diagram showing a backup executability judging system according to a second embodiment of this invention.

FIG. 17 is a block diagram showing a backup executability judging system according to a second embodiment of this invention.

FIG. 17 differs from FIG. 1 in that it is the storage 0113 that has the index creating module 0110, the backup execution judging module 0103, the index table 0119, the execution condition table 0104, and the keyword management table 0105. The computer system of this embodiment therefore does not need the backup executability judging server 0109. The rest of FIG. 17 is the same as FIG. 1. Descriptions on features that are common to this embodiment and the first embodiment will be omitted here.

Hardware constituting the computer system of this embodiment is the same as the one described in the first embodiment with reference to FIGS. 2 and 3.

The index creating module 0110, the backup execution judging module 0103, and the index table 0119 are implemented by the controller 0302 as are the I/O processing module 0114 and others. The index table 0119, the execution condition table 0104, and the keyword management table 0105 are stored in a not-shown memory within the controller 0302.

According to this embodiment, the I/O processing module 0114 detects updated data in a file and makes the index table 0119 reflect the update, to thereby keep the index table 0119 up to date. This makes the result of the differential amount calculation more accurate than in the first embodiment.

This embodiment also makes it possible to employ the existing backup software 0107 without any modifications by allowing the backup execution judging module 0103 inside the storage 0113 to judge the executability of backup at the time the backup server 0106 issues a snapshot request to the storage 0113.

Figure 18:
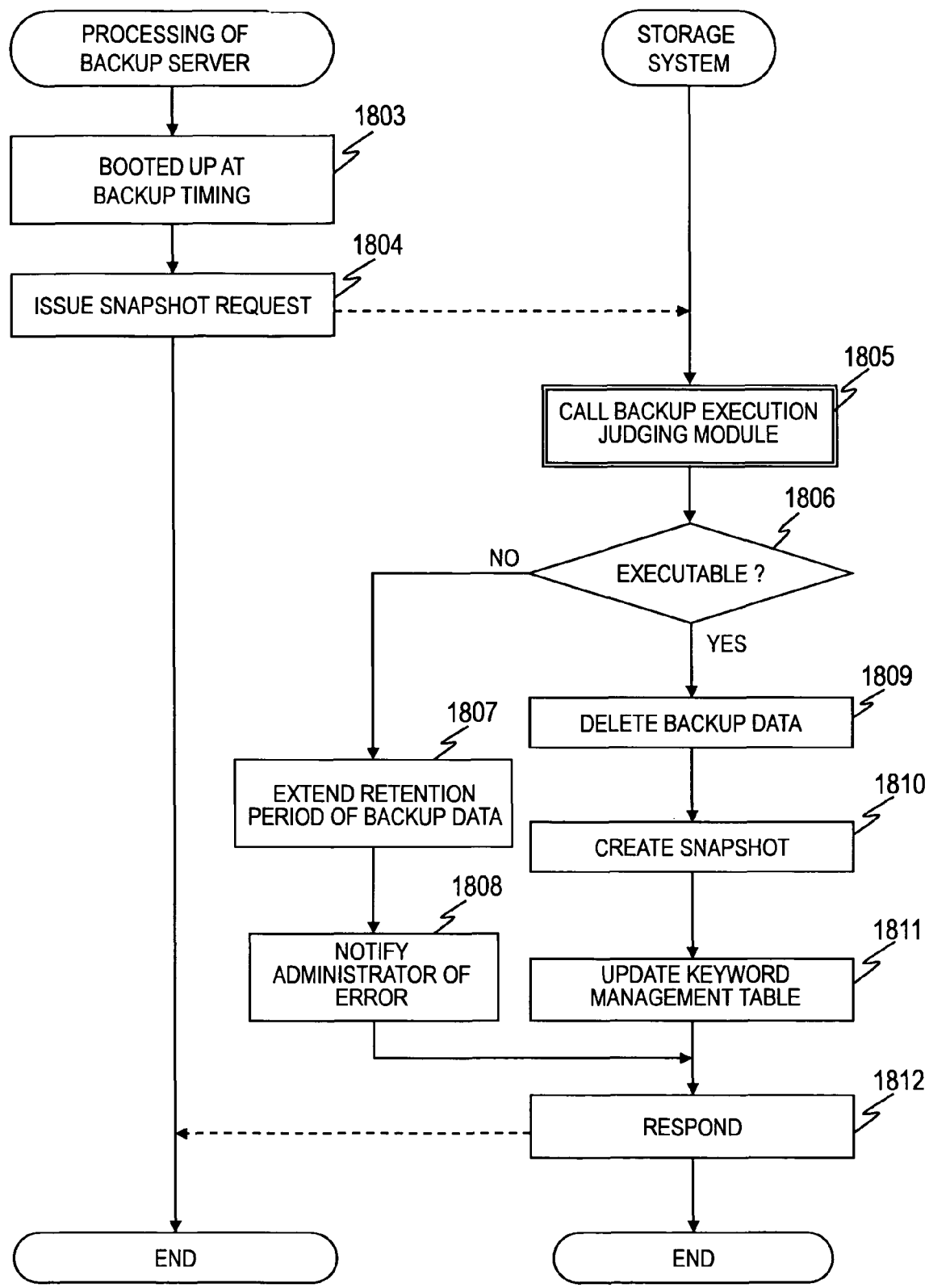
FIG. 18 is a flow chart showing a series of processing steps that is executed by backup software according to the second embodiment of this invention.

FIG. 18 is a flow chart showing a series of processing steps that is executed by the backup software 0107 according to the second embodiment of this invention.

First, the backup server 0106 is booted up as scheduled by a backup policy (Step 1803). This step is the same as Step 0804 of FIG. 8.

Next, the backup server 0106 issues a snapshot request to the storage 0113 (Step 1814). This step is the same as Step 0812 of FIG. 8.

The storage 0113 receives the snapshot request and calls up the backup execution judging module 0103 (Step 1805). The called up backup execution judging module 0103 executes the processing shown in FIG. 9.

The storage 0113 then interprets the result of the backup executability judgment as in Step 0808 of FIG. 8 (Step 1806). When it is judged that backup is not executable, the storage 0113 executes Step 1807. When it is judged that backup is executable, the storage 0113 executes Step 1809.

Step 1807 and the subsequent Step 1808 are the same as Step 0809 and Step 0810 of FIG. 8 except that it is the storage 0113 that executes Steps 1807 and 1808.

In Step 1809, the storage 0113 deletes backup data. The deletion is the same as the one executed when the storage 0113 of the first embodiment receives a backup data deletion request (Step 0811 of FIG. 8).

The storage 0113 then takes a snapshot (Step 1810). This step is the same as Step 0813 of FIG. 8.

The storage 0113 then updates the keyword management table 0105 (Step 1811). This step is the same as Step 0815 of FIG. 8 except that it is the storage 0113 that executes Step 1811.

After Step 1808 or Step 1811 is ended, the storage 0113 sends a response to the backup server 0106 (Step 1812). The processing is thus ended.

In the first and second embodiments described above, the threshold of the differential condition 0503 in the execution condition table 0104 may be set by the administrator or may be automatically calculated by continuing backup operation for a given period of time.

For instance, the backup server 0106 executes backup for a predetermined period of time (e.g., about a week) or a predetermined number of times whatever judgment is made about backup executability. Specifically, it is interpreted in Step 0808 or Step 1806 as "backup is executable" irrespective of the actual judgment result, and this is repeated a predetermined number of times. During the continuous backup operation, the backup execution judging module 0103 calculates a differential amount that indicates the difference between data to be backed up and backup data each time backup is executed (Step 0806 or Step 1805). This calculation is performed as shown in FIG. 10. In Step 1008, the backup execution judging module 0103 records the calculated differential amount.

After the backup operation in which backup is executed for a predetermined period of time or a predetermined number of times, a mean value or maximum value of the recorded differential amounts is set as the threshold of the differential condition 0503, and the calculation of the threshold is thus automated.

Another modification example of the first and second embodiments is as follows:

The backup execution judging module 0103 compares a differential amount that indicates the difference between data to be backed up and the latest backup data against a threshold. When the differential amount is equal to or larger than the threshold, it is considered that a significant change has been made to the data recently, and the backup server 0106 therefore stores in the temporary backup volume 0118 a copy of the data to be backed up without deleting backup data that has passed its retention period.

According to the above-described embodiments of this invention, backup data is deleted and a copy of data to be backed up is stored as new backup data only when a differential amount indicating the difference between the data to be backed up and the backup data does not exceed a given threshold.

Whether or not a virus infection, a mistake made by a user, or the like has changed the data to be backed up greatly is judged in this manner, and the risk of a failure in restoration of necessary data due to the loss, by deletion, of normal backup data is thus lowered.

The difference in appearance count of a keyword contained in data to be backed up and backup data may be used as a differential amount indicating the difference between the data to be backed up and the backup data.

This way, an accurate differential amount indicating the difference between data to be backed up and backup data is calculated.

Continuous backup operation may be employed, in which backup is executed no matter what (irrespective of the differential amount) a given number of times. During this operation, the differential amount is calculated and recorded each time backup is executed. The maximum value of the recorded differential amounts may be used as the threshold.

This makes it possible to automatically determine a threshold that suits the data update frequency or the backup execution frequency.

A computer system according to an embodiment of this invention keeps an index table of data to be backed up. The index table holds the appearance counts of keywords in the data to be backed up. When a backup is taken of the data to be backed up, a copy of the index table at that point is stored in a keyword management table. The index table is updated at least once after backup of the data to be backed up is executed and before the next time backup is executed. A differential amount indicating the difference between the data to be backed up and backup data is calculated by referring to the index table and the keyword management table.

A more accurate differential amount is calculated in this manner.

The above differential amount may be calculated by a backup executability judging server while a backup server judges whether or not the calculated differential amount exceeds a given threshold.

This way, conventional storage system can be used in carrying out this invention.

Alternatively, a storage system may calculate the above differential amount upon reception of a backup request, and judge whether or not the calculated differential amount exceeds a given threshold.

This way, a conventional backup server can be used in carrying out this invention. The accuracy of the index table is also improved.

In the case where there are a plurality of generations of backup data created at different times, a differential amount indicating the difference from data to be backed up may be calculated for each of the generations of backup data. Then backup data that has the smallest differential amount (backup data whose difference from the data to be backed up is smallest) is deleted.

This deletes backup data that is most similar to the data to be backed up out of a plurality of pieces of backup data. The risk of a restoration failure is thus lowered despite the deletion of this backup data.

The differential amount may be calculated for each file so that only files whose calculated differential amounts do not exceed a given threshold are backed up one file at a time.

This way, backup executability judgment of finer granularity is accomplished.

Data may be backed up to a temporary backup volume secured in advance without deleting backup data in the case where the calculated differential amount is larger than a predetermined threshold.

This generates the additional cost of the temporary backup volume, but ensures that backup is executed according to a backup policy.

In the case where the execution of backup is not permitted because the calculated differential amount exceeds a given threshold, the retention period of backup data is extended to the next backup execution time.

This prevents a backup server from automatically deleting backup data that has passed its retention period irrespective of whether backup is executed or not, and backup data is thus protected.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
  a storage system coupled to a network,
  wherein the storage system having one or more data storage devices containing a plurality of data storage areas, and a controller for controlling the data storage devices,
  wherein the plurality of data storage areas including a first storage area and a second storage area for storing a copy of data that is stored in the first storage area at one point in time, and
  wherein the storage system is configured to delete, only when the differential amount is smaller than the predetermined threshold, the data stored in the second storage area and newly store a copy of the data stored in the first storage area in the second; and
  a backup judging module,
  wherein the backup judging module is configured to judge whether or not a differential amount indicating a difference between data stored in the first storage area and data stored in the second storage area is smaller than a predetermined threshold, and
  wherein the backup judging module is further configured to:
    count keywords contained in at least one of data stored in the first storage area and data stored in the second storage area to calculate, for each of the keywords, a difference between an appearance count of the keyword in the data stored in the first storage area and an appearance count of the keyword in the data stored in the second storage area;
    add up one of an absolute value and square of the difference calculated for each of the keywords; and
    use the added up value as a differential amount indicating a difference between the data stored in the first storage area and the data stored in the second storage area.

2. The computer system according to claim 1,
  wherein the computer system holds information that indicates a schedule for storing a copy of data stored in the first storage area in one of the plurality of data storage areas,
  wherein the computer system further comprises an index creating module,
  wherein the index creating module is configured to:
    count, at least once, after a copy of data stored in the first storage area is stored in one of the plurality of data storage areas according to the information indicating a schedule and before the next time a copy of the data stored in the first storage area is stored in one of the plurality of data storage areas, the appearance count of each keyword that is contained in the data stored in the first storage area;
    hold the counted appearance count as a first appearance count; and
    hold, in a case where a copy of the data stored in the first storage area is to copy in the second storage area, a copy of the first appearance count as a second appearance count, which is an appearance count of a keyword contained in data stored in the second storage area, and
  wherein the backup judging module is further configured to calculate for each of the keywords the difference between the appearance count of the keyword in the data stored in the first storage area and the appearance count of the keyword in the data stored in the second storage area by calculating a difference between the held first appearance count and the held second appearance count.

3. The computer system according to claim 2, further comprising a first computer and a second computer, which are coupled to the network,
  wherein the first computer has a first interface coupled to the network, a first processor coupled to the first interface, and a first memory coupled to the first processor,
  wherein the second computer has a second interface coupled to the network, a second processor coupled to the second interface, and a second memory coupled to the second processor,
  wherein the information indicating a schedule is held in the first computer,
  wherein the first computer is configured to:
  send, when judged from the information indicating a schedule that time for a copy of the data stored in the first storage area to copy in one of the data storage areas, a judging request to the backup judging module; and
  send, only when a response indicating that execution of backup is permitted is received from the backup judging module, a backup request to the storage system, wherein the backup judging module and the index creating module are implemented by the second processor by executing a program that is stored in the second memory, wherein the first appearance count and the second appearance count are held in the second computer, wherein the backup judging module is further configured to:

judge, upon reception of the judging request, whether or not a differential amount indicating a difference between data stored in the first storage area and data stored in the second storage area is smaller than the predetermined threshold; and send, when judged that the differential amount is smaller than the predetermined threshold, a response indicating that execution of backup is permitted to the first computer, and wherein the storage system further configured to delete, upon reception of the backup request, the data stored in the second storage area and newly store a copy of the data stored in the first storage area in the second storage area.

4. The computer system according to claim 2, further comprising a first computer coupled to the network, wherein the first computer has a first interface coupled to the network, a first processor coupled to the first interface, and a first memory coupled to the first processor, wherein the information indicating a schedule is held in the first computer, wherein the first computer is configured to send, when judged from the information indicating a schedule that time for a copy of the data stored in the first storage area is to copy in one of the data storage areas, a backup request to the storage system, wherein each of the backup judging module and the index creating module is implemented by the controller by executing a predetermined program, wherein the first appearance count and the second appearance count are held in the storage system, wherein the backup judging module is further configured to judge, upon reception of the backup request, whether or not a differential amount indicating a difference between data stored in the first storage area and data stored in the second storage area is smaller than the predetermined threshold, and wherein the storage system is further configured to delete, when judged that the differential amount is smaller than the predetermined threshold, the data stored in the second storage area and newly store a copy of the data stored in the first storage area in the second storage area.

5. The computer system according to claim 1, wherein the backup judging module is further configured to calculate, a predetermined number of times, a differential amount indicating a difference between data stored in the first storage area and data stored in the second storage area, wherein the storage system is further configured to repeat, the predetermined number of times, processing of deleting the data stored in the second storage area and newly storing a copy of the data stored in the first storage area in the second storage area irrespective of whether the differential amount is smaller than the predetermined threshold or not, and wherein the backup judging module is further configured to use as the predetermined threshold a maximum value of differential amounts which are obtained by performing the differential amount calculation the predetermined number of times.

6. The computer system according to claim 1, wherein the plurality of data storage areas further include a third storage area, wherein the second storage area stores a copy of data that is stored in the first storage area at a first point in time, and the third storage area stores a copy of data that is stored in the first storage area at a second point in time, wherein the backup judging module is further configured to:

delete, when a differential amount indicating a difference between data stored in the first storage area and data stored in the second storage area is smaller than the predetermined threshold and is also smaller than a differential amount indicating a difference between the data stored in the first storage area and data stored in the third storage area, the data stored in the second storage area and newly store a copy of the data stored in the first storage area in the second storage area; and delete, when a differential amount indicating a difference between data stored in the first storage area and data stored in the third storage area is smaller than the predetermined threshold and is also smaller than a differential amount indicating a difference between the data stored in the first storage area and data stored in the second storage area, the data stored in the third storage area and newly store a copy of the data stored in the first storage area in the third storage area.

7. The computer system according to claim 1, wherein the backup judging module is further configured to calculate a differential amount indicating a difference between data that is stored in the first storage area and that is associated with a first file and data that is stored in the second storage area and that is associated with the first file to judge whether or not the differential amount is smaller than a predetermined threshold, and wherein the storage system is further configured to delete, only when the differential amount is smaller than the predetermined threshold, the data that is associated with the first file from the second storage area, and newly store a copy of the data that is stored in the first storage area and that is associated with the first file in the second storage area.

8. The computer system according to claim 1, wherein the plurality of data storage areas further include a fourth storage area, and wherein the storage system is further configured to store, when the differential amount is equal to or larger than the predetermined threshold, a copy of the data stored in the first storage area in the fourth storage area without deleting the data stored in the second storage area.

9. The computer system according to claim 1, wherein the computer system holds information that indicates a retention period of data stored in the second storage area, wherein the backup judging module is further configured to judge whether or not a differential amount indicating a difference between data stored in the first storage area and data stored in the second storage area is equal to or larger than the predetermined threshold, and whether or not the data stored in the second storage area has passed the retention period, and wherein the storage system is further configured to delete, when the differential amount is smaller than the predetermined threshold and the data stored in the second storage area has passed the retention period, the data stored in the second storage area and newly store a copy of the data stored in the first storage area in the second storage area; and wherein the storage system is further configured to update, when the differential amount is equal to or larger than the predetermined threshold and the data stored in the second storage area has passed the retention period, the information to extend the retention period of the data stored in the second storage area without deleting the data stored in the second storage area.

10. A method for controlling a computer system comprising:

a storage system coupled to a network, wherein the storage system having one or more data storage devices containing a plurality of data storage areas, and a controller for controlling the data storage devices, and wherein the plurality of data storage areas including a first storage area and a second storage area for storing a copy of data that is stored in the first storage area at one point in time, a first step of judging whether or not a differential amount indicating a difference between data stored in the first storage area and data stored in the second storage area is smaller than a predetermined threshold;

a second step of deleting, only when the differential amount is smaller than the predetermined threshold, the data stored in the second storage area and newly storing a copy of the data stored in the first storage area in the second storage area;

a third step of counting keywords contained in at least one of data stored in the first storage area and data stored in the second storage area to calculate, for each of the keywords, a difference between an appearance count of the keyword in the data stored in the first storage area and an appearance count of the keyword in the data stored in the second storage area; and a fourth step of adding up one of an absolute value and square of the difference calculated for each of the keywords, wherein the added up value is used as a differential amount indicating a difference between the data stored in the first storage area and the data stored in the second storage area.

11. The method according to claim 10, wherein the computer system holds information that indicates a schedule for storing a copy of data stored in the first storage area in one of the plurality of data storage areas, wherein the method further comprises:

a fifth step of counting, at least once, after a copy of data stored in the first storage area is stored in one of the plurality of data storage areas according to the information indicating a schedule and before the next time a copy of the data stored in the first storage area is stored in one of the plurality of data storage areas, the appearance count of each keyword that is contained in the data stored in the first storage area, and holding the counted appearance count as a first appearance count; and a sixth step of holding, in a case where a copy of the data stored in the first storage area is to be stored in the second storage area, a copy of the first appearance count as a second appearance count, which is an appearance count of a keyword contained in data stored in the second storage area, wherein the third step comprises calculating a difference between the held first appearance count and the held second appearance count.

12. The method according to claim 10, wherein the first step is repeated a predetermined number of times, and comprises storing the calculated differential amount, wherein the second step is repeated the predetermined number of times, and comprises deleting the data stored in the second storage area and newly storing a copy of the data stored in the first storage area in the second storage area irrespective of whether the differential amount is smaller than the predetermined threshold or not, and wherein a maximum value of differential amounts stored as a result of repeating the first step is used as the predetermined threshold.

13. The method according to claim 10, wherein the plurality of data storage areas further include a third storage area, wherein the second storage area stores a copy of data that is stored in the first storage area at a first point in time, and the third storage area stores a copy of data that is stored in the first storage area at a second point in time, wherein the second step comprises the steps of:

deleting, when a differential amount indicating a difference between data stored in the first storage area and data stored in the second storage area is smaller than the predetermined threshold and is also smaller than a differential amount indicating a difference between the data stored in the first storage area and data stored in the third storage area, the data stored in the second storage area and newly storing a copy of the data stored in the first storage area in the second storage area; and deleting, when a differential amount indicating a difference between data stored in the first storage area and data stored in the third storage area is smaller than the predetermined threshold and is also smaller than a differential amount indicating a difference between the data stored in the first storage area and data stored in the second storage area, the data stored in the third storage area and newly storing a copy of the data stored in the first storage area in the third storage area.

14. The method according to claim 10, wherein the first step comprises the step of calculating a differential amount indicating a difference between data that is stored in the first storage area and that is associated with a first file and data that is stored in the second storage area and that is associated with the first file to judge whether or not the differential amount is smaller than a predetermined threshold, and wherein the second step comprises the step of deleting, only when the differential amount is smaller than the predetermined threshold, the data that is associated with the first file from the second storage area, and newly storing a copy of the data that is stored in the first storage area and that is associated with the first file in the second storage area.

15. The method according to claim 10, wherein the plurality of data storage areas further include a fourth storage area, and wherein the method further comprises a seventh step of storing, when the differential amount is equal to or larger than the predetermined threshold, a copy of the data stored in the first storage area in the fourth storage area without deleting the data stored in the second storage area.

16. The method according to claim 10,
wherein the computer system holds information that indicates a retention period of data stored in the second storage area,
wherein the method further comprises:
an eighth step of judging whether or not the data of the second storage area has passed the retention period; and
a ninth step of updating, when the differential amount is equal to or larger than the predetermined threshold and the data stored in the second storage has passed the retention period, the information to extend the retention period of the data stored in the second storage area without deleting the data from the second storage area, and
wherein the second step comprises the step of deleting, when the differential amount is smaller than the predetermined threshold and the data stored in the second storage area has passed the retention period, the data stored in the second storage area and newly storing a copy of the data stored in the first storage area in the second storage area.

* * * * *